United States Patent
Shah et al.

(10) Patent No.: US 9,690,679 B2
(45) Date of Patent: Jun. 27, 2017

(54) TRANSACTION COMMITMENT AND REPLICATION IN A STORAGE SYSTEM

(75) Inventors: Mehul A. Shah, Saratoga, CA (US); Wojciech Golab, Mountain View, CA (US); Indrajit Roy, Mountain View, CA (US); Nathan Lorenzo Binkert, Redwood City, CA (US); Stavros Harizopoulos, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1391 days.

(21) Appl. No.: 13/285,884

(22) Filed: Oct. 31, 2011

(65) Prior Publication Data

US 2013/0110774 A1 May 2, 2013

(51) Int. Cl.
| | |
|---|---|
| *G06F 17/30* | (2006.01) |
| *G06F 11/20* | (2006.01) |
| *G06F 11/16* | (2006.01) |
| *G06F 11/18* | (2006.01) |
| *G06Q 10/10* | (2012.01) |
| *G06F 11/14* | (2006.01) |

(52) U.S. Cl.
CPC ...... *G06F 11/2035* (2013.01); *G06F 11/1474* (2013.01); *G06F 11/1658* (2013.01); *G06F 11/1666* (2013.01); *G06F 11/183* (2013.01); *G06F 11/2023* (2013.01); *G06F 11/1425* (2013.01); *G06Q 10/10* (2013.01)

(58) Field of Classification Search
CPC .............................................. G06F 17/30581
See application file for complete search history.

(56) References Cited

U.S. PATENT DOCUMENTS

| | | |
|---|---|---|
| 6,360,231 B1 | 3/2002 | Pong et al. |
| 6,944,719 B2 | 9/2005 | Rowlands et al. |
| | (Continued) | |

FOREIGN PATENT DOCUMENTS

JP  2001243209 A  9/2001

OTHER PUBLICATIONS

Bolosky, William J., et al., "Paxos Replicated State Machines as the Basis . . . ," Available at http://www.usenix.org/event/nsdi11/tech/full_papers/Bolosky.pdf.

(Continued)

*Primary Examiner* — Mohammad S Rostami
(74) *Attorney, Agent, or Firm* — International IP Law Group, PLLC

(57) ABSTRACT

An embodiment provides a system and method for transaction commitment and replication. The method includes receiving a minitransaction from a client node at one or more memory nodes, wherein each memory node includes a number of replicas. The minitransaction is a type of transaction which atomically executes any combination of reading, comparing, and writing to any of a number of memory locations. The method also includes determining, for a leader of the replicas within a memory node, whether the leader is able to commit the minitransaction and stabilizing state changes of the minitransaction within a transaction log using a consensus procedure to update the replicas. The method further includes committing the minitransaction if, at each memory node, a quorum of the replicas is able to stabilize the minitransaction, or aborting the minitransaction otherwise.

18 Claims, 3 Drawing Sheets

(56) References Cited

U.S. PATENT DOCUMENTS

| | | | |
|---|---|---|---|
| 7,082,501 B2 | 7/2006 | Chen et al. | |
| 7,124,252 B1 | 10/2006 | Khare et al. | |
| 7,155,524 B1* | 12/2006 | Reiter et al. | 709/229 |
| 7,558,883 B1* | 7/2009 | Lamport | 709/248 |
| 7,609,703 B2 | 10/2009 | Shah et al. | |
| 7,647,454 B2 | 1/2010 | Aguilera et al. | |
| 7,698,465 B2 | 4/2010 | Lamport et al. | |
| 7,774,469 B2* | 8/2010 | Massa et al. | 709/226 |
| 7,856,502 B2 | 12/2010 | Lamport et al. | |
| 7,904,668 B2 | 3/2011 | Shavit et al. | |
| 2004/0044685 A1 | 3/2004 | Huynh et al. | |
| 2008/0071853 A1* | 3/2008 | Mosier et al. | 709/201 |
| 2008/0071957 A1 | 3/2008 | Shah | |
| 2009/0150566 A1* | 6/2009 | Malkhi et al. | 709/242 |
| 2009/0299863 A1 | 12/2009 | Shah et al. | |
| 2010/0049718 A1 | 2/2010 | Aronovich et al. | |
| 2010/0192018 A1 | 7/2010 | Aiyer et al. | |
| 2011/0225425 A1 | 9/2011 | Kotla et al. | |
| 2011/0313973 A1* | 12/2011 | Srivas et al. | 707/634 |
| 2012/0011398 A1* | 1/2012 | Eckhardt et al. | 714/15 |
| 2012/0239722 A1* | 9/2012 | Bolosky et al. | 709/201 |

OTHER PUBLICATIONS

Schintke, Florian, et al., "Enhanced Paxos Commit for . . . ," 10th IEEE/ACM International Conference on Cluster, Cloud, and Grid Computing, 2010, pp. 448-454.

* cited by examiner

100

200

TRANSACTION COMMITMENT AND REPLICATION IN A STORAGE SYSTEM

BACKGROUND

Many modern businesses are in need of storage infrastructure that supports modern-scale applications by reacting quickly and efficiently to changing conditions. Examples of such modern-scale applications include financial trading, electronic auctioning, social networking, and multi-player gaming applications. These types of modern-scale applications benefit from storage infrastructure that offers high availability, high scalability, and low latencies. In addition, transactional consistency may be important because these types of applications are often being returned and re-engineered to meet users' needs. Transactional consistency provided by internal system interfaces allows system architects to build simpler migration paths as architecture evolves from one to another.

Traditional solutions that aim to solve this problem, such as databases, provide transactions and continuous operation, but have limited scalability and high latencies. For example, databases include many features that, when combined, result in compromises that limit their scalability. Databases also have limited response times because disks are the primary storage for databases. In addition, traditional file systems and block stores have similar problems, lack transactions, and also provide interfaces that are not well suited for modern-scale applications. Therefore, there is a recent push to use new and simpler stores, or database management systems, which scale well and offer more streamlined key-value interfaces that are better suited to modern-scale applications. Unfortunately, most of these stores sacrifice consistency for improved availability and, hence, lack transactions.

Memory for a computer system is technically any form of electronic, magnetic, quantum-mechanical, or optical storage solutions. However, it is generally divided into different categories based in part upon speed and functionality. One category is mass storage, which typically includes permanent, non-volatile memory stores. Mass storage is generally understood to include relatively cheap, slow, and large-capacity devices, such as hard drives, tape drives, optical media, and other mass storage devices. The primary object of mass storage devices is to store an application or data until it is required for execution. To prevent loss of data, data is often replicated between two or more redundant storage devices. Replication introduces a degree of latency to the storage system. As used herein, the term "latency" refers to the delay between the time at which a client makes a request to a service and the time at which it receives a response from a service. The service is any system that promises to support an interface, and the system can be composed of memory, storage, networks, or computers of a variety of types. Mass storage devices typically provide a computer system with storage capacity ranging to the tens of terabytes and operate with access times generally in excess of one millisecond. However, because mass storage typically involves high latencies, the use of mass storage may not be sufficient for modern-scale applications, which require fast reaction times.

A second general memory category is application memory, or main memory, which is intended to permit quick access for processing and is typically connected by a memory bus directly to the computers processor. In contrast to the relatively slow mass storage, main memory generally includes relatively fast, expensive, volatile random access memory (RAM) with access times generally less than one hundred nanoseconds. However, due to the volatile nature of main memory, many applications utilizing main memory rely on a continuous power supply to maintain functionality.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Figure 1:
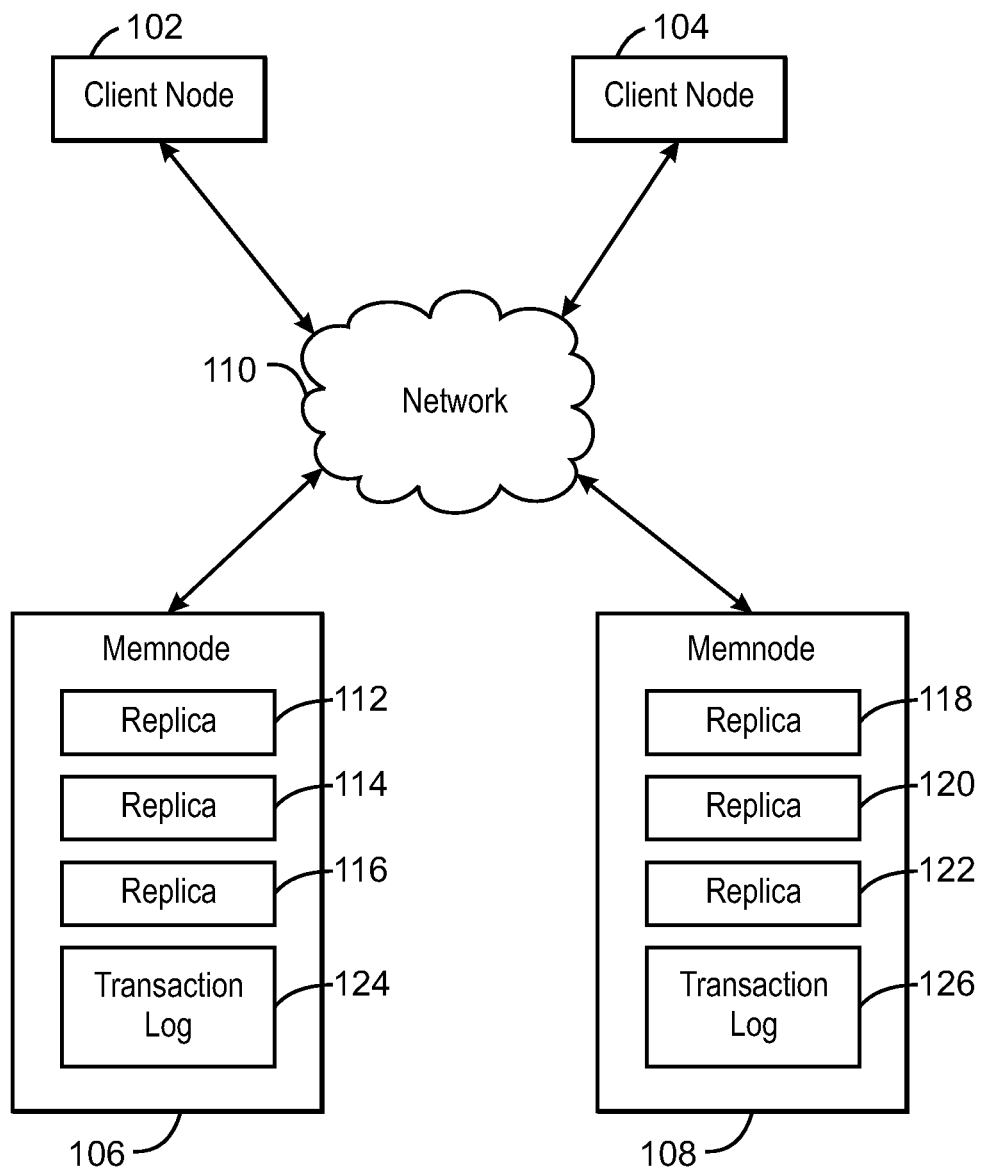
FIG. 1 is a block diagram of a distributed transactional storage system, in accordance with embodiments.

As used herein, a "transaction" is an atomic unit of work within a storage system that is indivisible and irreducible. In other words, each transaction will have either complete success, or commitment, or complete failure. A data file that has been written to the storage system will remain unaltered in the storage system until the data file is overwritten by a subsequent transaction. Thus, the use of transactions within a storage system increases the durability of the stored data. Currently, there are a number of distributed main-memory systems. However, the main drawback of such systems is that they provide limited, if any, transactional semantics. There are also a number of transaction-based storage systems. However, the standard two-phase commitment protocols used in such systems block a transaction when the coordinator, or client, fails. A distributed system, such as a transactional shared memory system, provides high scalability, transactions, fast memory, and minimal network latencies during normal operation. However, many distributed systems achieve fault-tolerance in a primary backup configuration for server nodes, which are memory nodes where all data is kept in memory. Unfortunately, the primary backup approach requires accurate failure detection and, therefore, has diminished availability in the face of failures, which can lead to long stalls. For example, the system must ensure that the primary is dead before allowing operations to proceed with the backup. Resolving this failure can take tens of seconds to minutes, causing some operations to incur long stalls.

In embodiments, a particular type of transaction which may be used in conjunction with the current method and system is a "minitransaction." A minitransaction is a specific type of atomic transaction, in which the memory locations that will be accessed by the transaction are declared prior to starting the transaction. This type of transaction may be referred to as a static transaction. A minitransaction may include read items, write items, and comparison items that involve a number of memory locations and ranges, or pages, within a memnode. In embodiments, a page is a specific range of memory addresses in the address space of a single memnode. The decision to commit or abort a minitransaction may depend on the outcome of the comparisons corresponding to the comparison items.

Embodiments described herein provide techniques for state-machine replication and transaction commitment in a distributed transactional storage system using a single protocol for both commitment of transactions and state-machine replication. In various embodiments, the distributed transactional storage system described herein provides for both durability and availability of the stored data. The availability of the distributed transactional storage system is achieved by ensuring that, if one server replica fails or goes offline, the other sever replicas may still operate and continue to offer the promised services, which may involve both reading and writing data. Moreover, the distributed transactional storage may also provide high availability because there is no primary node or backup node but, instead, all of the nodes operate on an equal level. Further, the distributed system may function without interruptions as long as a quorum of nodes is available. Thus, the storage system may operate completely in-memory without relying on the primary-backup approach.

FIG. 1 is a block diagram of a distributed transactional storage system 100, in accordance with embodiments. The system 100 may include client nodes 102 and 104 and memory nodes, referred to herein as "memnodes", 106 and 108 interconnected through a network 110. Each node may be a device that is connected as part of a computer network. For example, each client node 102 or 104 may be a separate general-purpose computer, and each memnode 106 or 108 may be a separate server. The nodes may also include records used to build linked data structures, such as linked lists, trees, and graphs. For example, each node may include a computer or a data field and other fields that form links to other nodes. Client nodes 102 and 104 may initiate transactions, while memnodes 106 and 108 may store the state acted on by transactions.

Memnodes 106 and 108 may be replicated across multiple machines, called replicas. The replicas for one memnode 106 or 108 constitute a replica group. For example, the memnode 106 may include replicas 112, 114, and 116, while the memnode 108 may include replicas 118, 120, and 122. Moreover, any suitable number of additional replicas may be included in each replica group. In various embodiments, the replicas may be consensus-based replicas that utilize a Paxos consensus algorithm to perform a consensus procedure according the method disclosed herein.

In addition, a "replica" may be referred to simply as a "node," since a replica may be a type of node contained within a memnode 106 or 108. In an embodiment, the set of replicas within one memnode 106 or 108 may be referred to as a "virtual memnode" or "logical memnode." In an embodiment, client nodes 102 and 104 may communicate directly with the individual replicas within a memnode 106 or 108 and, thus, may be aware of the internal structure of a virtual memnode. In embodiments, consensus among the replicas of a memnode 106 or 108 may be solved independently of the client node 102 or 104 by initiating a consensus procedure within the memnode 106 or 108. In addition, transaction logs 124 and 126 may be contained within the memnodes 106 and 108, respectively, and each particular instance of the transaction log 124 or 126 may be replicated to all the replicas within the memnode 106 or 108.

In embodiments, the storage memory included in the memnodes 106 and 108 for use by the client nodes 102 and 104 may be volatile memory, such as random access memory (RAM) often referred to as "main memory". This may allow for low latencies due to the high-speed nature of volatile main memory. As discussed above, low latencies provided by main memory provide quick reactions to changing conditions, which is beneficial for modern-scale applications. Therefore, the distributed transactional store described herein may operate completely in-memory, meaning that it generally utilizes volatile main memory, with the exception that mass storage may be used for archival purposes.

The memnodes 106 and 108 may be attached devices providing random access memory (RAM) and/or disk space (for storage and as virtual RAM) and/or some other form of storage such as tapes, MEMS, optical disks, integrated circuits, and the like. Memnodes 106 and 108 may also be commercially-available computer systems, such as desktop or laptop systems, or other computer system providers. In addition, memnodes 106 and 108 may be specialized devices, such as network disk drives or disk drive arrays, high speed tape, MRAM systems or other devices, or any combinations thereof.

The memnodes 106 and 108 may also include logical units and may be used to ensure that the appropriate replicas are accessed for each transaction. The available memory within each memnode may be organized as a sequence of words. In an embodiment, each memnode 106 or 108 may provide a sequence of raw or uninterrupted words of a predetermined standard size, wherein each word consists of a certain bit array. For example, a word may contain eight, thirty-two, or sixty-four bits, or five hundred twelve bytes. In at least one embodiment, the word spaces have eight bits. Moreover, in an embodiment, the words may be organized as address spaces, such as linear address spaces. In addition, within the system 100, data may be globally referenced by an address pair. For example, the address pair may be (mem-id, address), where "mem-id" is the identifier of a specific memnode and "address" is a number within the address space of the specific memnode. Further, it is to be understood and appreciated that there may be multiple different ways to organize the address space for each memnode, such as, for example, into a set of pages of fixed sizes.

The memnodes 106 and 108 may be servers that export a large, linear, unstructured memory interface. The memnodes 106 and 108 may be referred to simply as "servers" or "participants." The memnodes 106 and 108 may be computers dedicated to serving programs running on other computers on the same network. Moreover, the memnodes 106 and 108 may also be computer programs that serve other programs, or "clients," which are on the same network and may or may not be on the same computer. In embodiments, the memnodes 106 and 108 may be software or hardware systems, such as database servers or file servers.

In addition, the system 100 may include any number of additional memnodes or may include only one memnode, depending on the specific application. Furthermore, the system may be scaled by providing additional memnodes to increase the amount of memory available to the client nodes. Further, multiple memnodes may be stored within one computer system, or all memnodes may be located in separate computer systems and connected through the network 110.

The client nodes 102 and 104 may include systems which are used by a human operator or by some software system. More specifically, client nodes 102 and 104 are systems which are capable of and intended for use in processing applications as may be desired by a user or by some software system. As used herein, the term "software system" refers to a set of non-transitory, computer-readable instructions that direct a processor to perform specific functions. The client nodes 102 and 104 may also be used to initiate transactions, such as, for example, minitransactions. The client nodes 102 and 104 may be commercially-available computer systems, such as desktop or laptop computers, or any other type of suitable computing device. In addition, the system 100 may include any number of additional client nodes or may include only one client node, depending on the specific application.

Further, in some embodiments, the client nodes 102 and 104 and memnodes 106 and 108 may be discrete elements logically or physically separated from one another. In other embodiments, any number of the client nodes 102 and 104 and memnodes 106 and 108 may be physically co-located, such as in a rack or within the same system box.

Through the network 110, the nodes may exchange messages in order to complete a protocol for state-machine replication and transaction commitment. For example, the client nodes 102 and 104 may send a prepare message for a minitransaction to the specified memnodes 106 and 108 through the network 110. The memnodes 106 and 108 may perform a consensus procedure to attempt to stabilize the state changes for a particular minitransaction and, depending on the outcome of the procedure, may respond to the prepare message by sending a commit message or an abort message to the client nodes 102 and 104 through the network 110. Depending on whether a commit message was received from a quorum of the replicas within a memnode, the client nodes 102 and 104 may send a commit outcome or an abort outcome back to the memnodes 106 and 108 through the network 110. The memnodes 106 and 108 may then commit and install the state changes or abort the minitransaction depending on the outcome message that was received. Network delays may occur for each time a node sends a message through the network 110. The protocol described herein may result in four network delays in the common case.

In an embodiment, the system 100 may utilize a traditional network, such as a wired or wireless WAN or LAN operating at conventional speeds, or the system may utilize an optical fiber network to provide faster response times. However, in most cases, the latency of the network 110 may not be a significant issue, and the transaction instruction set advantageously permits desired transactions to be collectively executed atomically. Moreover, the network 110 interconnecting the memnodes 106 and 108 and the client nodes 102 and 104 can be any medium, device, or mechanism that allows the nodes to communicate effectively. Further, the network 110 interconnecting the memnodes 106 and 108 and the client nodes 102 and 104 need not be homogeneous but, rather, may include multiple different types of networks. For example, one network may be established with a physical wire, while another network may be established with radio transmission. Indeed, portions of the network or networks may have different bandwidths, latencies, packet sizes, access mechanisms, reliability protocols, and ordering guarantees.

In an embodiment, the system 100 may operate according to a protocol that enables transactional access to memory distributed over multiple servers and also ensures that the state of each server is replicated across multiple machines. The protocol may use a consensus algorithm to ensure that transaction commitment across multiple servers is atomic and non-blocking. In an embodiment, the protocol may utilize the Paxos consensus algorithm. As used herein, the term "non-blocking" refers to a system which enables transactions to be successfully completed even if one or more nodes becomes inoperable due to network delays or a failure of one or more system components. In other words, a non-blocking system deals with the failure of a server or node smoothly to avoid network delays that would otherwise be caused in a blocking system when a failure occurs in the system. In a blocking system, the user may be forced to wait for a response from the system for a long time, sometimes on the order of a thousand times longer than usual. The non-blocking nature of the protocol described herein is possible because there is no primary node or backup node, as discussed above. Rather, a proposed transaction can be committed if a quorum of replicas is operable and able to commit the transaction. Therefore, the system's availability may not be compromised by the failure of a single node in the system. As long as a quorum of the replicas is available, the system may function properly. The quorum size used to determine whether to commit a transaction may be any specified number of replicas or proportion of replicas in a replica group. In embodiments, the quorum may be a majority quorum. For example, if there are three replicas in a replica group the system may commit a transaction if two or more replicas are operational. Similarly, if there are seven replicas in a replica group, the system may commit the transaction if four or more replicas are operational. However, other quorum systems may be used in accordance with embodiments, and different quorum sizes may be used for reading and writing data.

In an embodiment, the protocol may utilize state-machine replication to replicate the state of a server. State-machine replication ensures that, once a transaction is committed, each replica of each memnode that is involved in a particular transaction may be updated. This provides for a high degree of consistency between all of the replicas within a memnode 106 or 108. In addition, many different types of replication procedures may be used to implement the current protocol, such as, for example, Paxos consensus on the minitransaction log.

As discussed above, in an embodiment, the protocol used in conjunction with system 100 may employ the Paxos consensus algorithm. The Paxos consensus algorithm is a type of protocol that may be used for reaching an agreement, or consensus, among multiple servers in a network or multiple server replicas within a server regarding transaction commitment. Consensus may often become difficult when a communication medium between multiple participants may experience failures. The Paxos consensus algorithm may rely on the interaction of multiple components that serve three roles: learners, acceptors, and proposers. A proposer is a memnode replica, or in some embodiments, the client or transaction coordinator. The value it proposes is a transaction that can successfully be committed, or prepared, on that memnode to be stabilized for a particular log sequence number (LSN). A proposer may send its proposal to the acceptors. Each proposal in Paxos has a ballot number. The Paxos consensus algorithm relies on the agreement of a quorum of acceptors which, in some embodiments, are the replicas of a memnode. The acceptors function as the fault-tolerant memory of a Paxos node. The acceptors collectively remember which transaction was prepared for which LSN in case a failure occurs and a reaper or recovery process is launched to complete the transaction. In that case, the recovery process obtains information from the acceptors to be used for determining whether the transaction is to be committed or aborted. In an embodiment, the replicas in the memnodes 106 and 108 may serve as acceptors. In addition, the client nodes 102 and 104 may serve as proposers or learners, or both.

When the leader memnode proposes a transaction to be stabilized in some LSN to the acceptors, the decision may be accepted by a quorum of acceptors, which may notify the learners, i.e., the client nodes, about the value accepted and the ballot number. Once a quorum of acceptors accepts the same value in the same ballot, the Paxos consensus service is said to converge on that value. Once a learner receives notifications with the same round number form a quorum of acceptors, the learner knows that the Paxos consensus service has converged, and it also knows the decision for the transaction. In an embodiment, one component of a system may perform all three roles, while, in another embodiment, any subset of the three roles may be performed by different components of a system, such as by three different systems. In another embodiment, a learner may be a proposer or one of a number of proposers.

Figure 2:
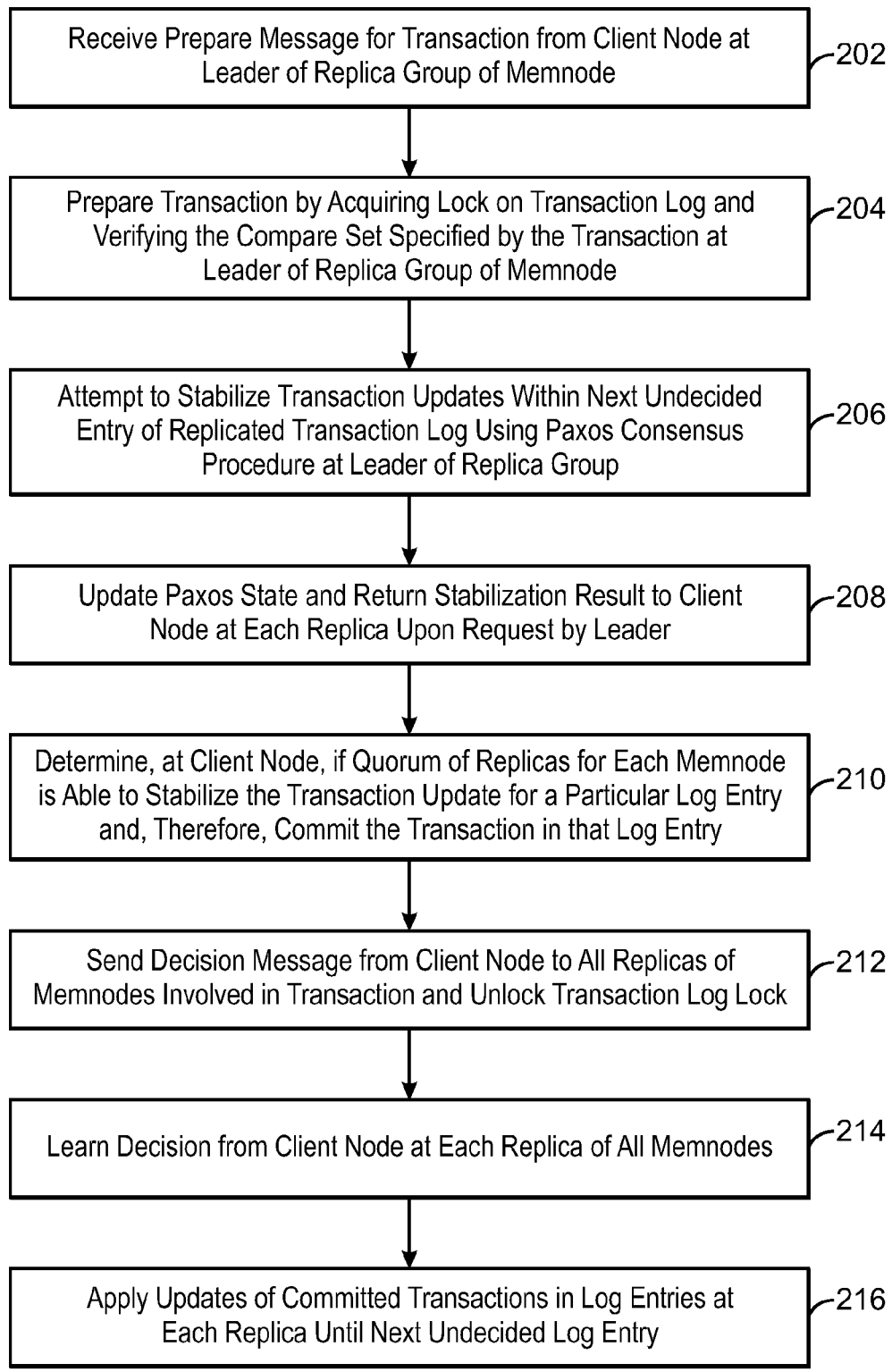
FIG. 2 is a process flow diagram showing a method for transaction commitment and replication, in accordance with embodiments.

FIG. 2 is a process flow diagram showing a method 200 for transaction commitment and replication, in accordance with embodiments. The term "transaction commitment" refers to the agreement between multiple servers or systems to allow a transaction to proceed and not to abort the transaction. In other words, for every transaction, a decision may be made to either commit or abort the transaction. In an embodiment, this decision may be determined based on which participants vote to commit the transaction, and based on the evaluation of comparisons in the minitransaction. The transaction may include a "transaction log," wherein a transaction log includes a sequence of state-changes that are applied within a replica. In some embodiments, there may be a separate transaction log per page, or each predetermined-sized chunk of memory, to allow concurrency among transactions. Moreover, a transaction may utilize a replicated transaction log that is replicated to a separate degree from a replication degree of a memnode state.

Server replication is the process of copying and distributing data or database objects from one database to another and synchronizing databases to maintain consistency between multiple databases. The distribution and synchronization of data or database objects may be implemented using a local area network (LAN), wide area network (WAN), dial-up connection, wireless connection, or the Internet. In addition, for server-to-server replication, the data or database objects may be updated as transactions are committed. In other words, the replication system may operate on a transaction-by-transaction basis.

In embodiments, a transaction instruction set may be assembled at a client node. The transaction instruction set stores information regarding the transaction, such as the particular functions (i.e., write, compare, or, read) to be performed by the transaction and the identity of the originating client node. In embodiments, the particular type of transaction that is utilized in conjunction with the method 200 may be a minitransaction. The transaction instruction set may include one or more subsets, including a write subset, a compare subset, or a read subset, or any combinations thereof. Each subset in a transaction may include subset members that provide information used to execute the transaction, such as a memory node identifier, memory address range, write data, compare data, and the like. In embodiments, the memory node identifier is determined from the memory address range.

In embodiments, the structure of the transaction instruction set may be predetermined to provide a shell structure for a write subset, a compare subset, and a read subset, into which valid members are added. A non-valid member is one having null for the memory address and memory address range, which effectively results in an empty subset. In certain embodiments, use of the pre-defined shell structure may be advantageous in reducing overhead for the assembly of the transaction instruction subsets.

The client node may select the appropriate subset members for the transaction. A write subset member may include a valid memnode identifier, a memory address range, and write data. A compare subset member may include a valid memnode identifier, a memory address range, and compare data. A read subset member may include a valid memnode identifier and a memory address range.

The transaction instruction set may include any suitable combination of subset members. For example, the transaction may include only write subset members, or a combination of write subset members, compare subset members, and read subset members, as well as other types of combinations. Moreover, the presence of a read subset member is not required to establish a valid transaction instruction set. Once the transaction subset members have been determined, a decision of whether or not to add any additional transaction subset members to the transaction instruction set may be made. If additional transaction subset members are desired, the assembly of the transaction instruction set may continue. Otherwise, the method 200 may begin at block 202.

At block 202, the leader of a replica group of a memnode may receive the transaction from the client node. Specifically, the memnode may receive a prepare message for the transaction from the client node. The memnode may include a number of replicas. The state of the memnode, or server, may consist of a set of memory regions, or pages, of fixed size. In addition, there may be a lock for the transactional log to facilitate transaction commitment. In embodiments, the prepare message which is received from the client node may be as follows:

PREPARE_REQ(TID, S, R, C, W, readOnly),
where TID=the transaction identification (ID) number, S=the set of memnodes involved in the transaction, R=read items at the recipient memnode, C=compare items at the recipient memnode, W=write items at the recipient memnode, and readOnly=a Boolean flag that is true if and only if the transaction has no write items. The prepare message may be used to initiate the preparation of the transaction at the memnode.

At block 204, the leader of the replica group of the memnode may attempt to prepare the transaction by acquiring a lock on the transaction log and verifying the compare set specified by the transaction. In various embodiments, the leader of the replica group may prepare the transaction by locking the transaction log and comparison set matching values stored in the leader. Further, in some embodiments, a log sequence number (LSN) may be computed for the transaction, wherein the LSN is a unique sequential identification for the transaction log record. Along with the acquired lock, the memnode indicates the next available log entry, e.g., the next LSN, whose outcome has not yet been decided and the identification of the current log entry that it is trying to execute. If the lock acquire is determined to be unsuccessful, an abort message may be returned to the client node. If lock acquire is determined to be successful, the leader replica may compute the values of all read members specified by the transaction instruction set. In addition, any compare members specified by the transaction may be executed. A determination of whether the compare was successful may be made. If the compare is negative, an abort message may be returned to the client node. If the compare is positive, the leader will try to stabilize the write set in the next undecided log entry, e.g., next LSN, of the transaction log using Paxos consensus.

At block 206, the leader of the replica group of the memnode may attempt to stabilize the transaction updates within the next undecided entry of the replicated transaction log using a Paxos consensus procedure. The transaction's write set may be stabilized in the next transaction log entry, e.g., the next LSN. All of the entries of the transaction log are replicated across all replicas in a memnode using a Paxos consensus procedure. In the common case, the Paxos consensus procedure only consists of the Paxos leader sending a Paxos accept message to the replicas, indicating the next LSN (nextLSN), transaction id (TID), write items (W), and leader's ballot number from an earlier Paxos promise message (leader Ballot), as follows:

ACCEPT_REQ(nextLSN, TID, W, leaderBallot)

Moreover, in various embodiments, the stabilization of the transaction updates may be accomplished using a stabilization procedure, which applies Paxos consensus on a transaction log entry within the memnode. Once the stabilization procedure is complete, the client node may learn the result of the procedure.

At block 208, each replica, upon request by the leader, updates the Paxos state and returns the stabilization, or Paxos consensus, result to the client node. Each replica acts as an acceptor for the transaction log entry specified in the accept request. As per Paxos consensus, if a replica has not participated in a higher-numbered ballot, the replica will accept and store the transaction identification (TID) and write set (W) for the next LSN entry of the transaction log. Each replica applies this entry to its internal state once the transaction outcome is decided and learned in the upcoming steps of the method 200. Once the accept request is received, each replica responds to the client node with a result of this accept or stabilization phase with a vote message for the transaction:

VOTE_MSG(TID, nextLSN, accept/nack, IsnBallot, IsnTID)

The accept/nack indicates whether the replica accepted the value proposed by the leader of the replica group. In addition, the replica returns the internal state of Paxos consensus for the nextLSN transaction entry: IsnBallot and IsnTID. The IsnBallot indicates the largest ballot that the replica participated in for that entry, and the IsnTID indicates the transaction identification of the write set that the replica has accepted for that entry.

At block 210, the client node determines if a quorum of replicas for each memnode is able to stabilize the transaction updates, e.g., accept the transaction update set, for a particular log entry and, therefore, commit the transaction in that log entry. The client node collects the responses from all replicas involved in a transaction. There are two types of responses from a memnode, including an abort or a collection of vote messages. If any memnode returns an abort, the client node decides an abort for the transaction. Otherwise, it collects the votes from the memnode replicas. If a quorum of the votes are accepts, the undecided LSN (nextLSN) has been stabilized, and the vote is to commit for that memnode. If all memnodes commit, then the client node decides to commit the transaction.

At block 212, the client node sends a decision message to all the replicas of the memnodes involved in the transaction:

DECISION(TID, nextLSN, commit/abort)

Moreover, the client node may also send the corresponding log entry to all the replicas.

At block 214, each replica of all memnodes in the transaction learns the decision from the client node, and the transaction log lock is unlocked. For the given nextLSN transaction log entry, the internal Paxos state is updated to include the decided transaction's write set and transaction id, and the decision is also recorded. That transaction log entry also transitions from undecided to decided in the local copy of transaction log. If the replica has a lock on the transaction log and nextLSN is noted for the lock, then the lock is released. If the transaction id with the transaction lock does not match TID, then the replica sends an abort message to the client node that initiated the aborting transaction.

At block 216, each replica applies the updates of committed transaction in the log entries until the next undecided log entry. In various embodiments, a state of each of the replicas may be updated to a most recent state by installing the state changes of successfully committed transactions in order of the transaction log until a most recent undecided transaction is reached. Moreover, each replica may apply the write set of each newly decided entry in order of the transaction log, transaction-by-transaction, until it reaches an entry that is undecided. The nextLSN variable for that replica is incremented to this undecided transaction log entry.

FIG. 2 is not intended to indicate that the steps of method 200 are to be executed in any particular order. In addition, any number of the steps of method 200 may be deleted, and any number of additional steps may be added, depending on the specific application. While the method 200 is described as involving only one memnode and one client node, any number of memnodes and client nodes may be involved in one or multiple concurrent implementations of the steps of the method 200. Moreover, any type of static transaction, such as a minitransaction, may be utilized in conjunction with the method 200. Furthermore, in some embodiments, the leader of the replicas may change at any time, multiple leaders may exist at any one time, the client node may fail, and a minority of the replicas may fail.

The method 200 may suffer practical performance limitations because a single lock on the transaction log allows a memnode to process only a single transaction at a time. Therefore, in various embodiments, the method 200 may be improved by allowing for the processing of the transaction log according to each small amount of memory contained within the log. This may be accomplished by creating separate transaction logs for each predetermined, small amount of memory, such as, for example, an individual page. Then, the server replication and transaction commitment method described with respect to FIG. 2 may allow for the processing of multiple concurrent transactions in parallel, as long as the transactions do not attempt to access the same page or word, and thereby improve overall performance. Prior to the method 200 or after a leader of the memnode fails, a new leader is chosen using any standard approximate leader election algorithm. When a new leader is elected, the leader chooses a new leaderBallot that is larger than any previous leaderBallot. Using that leaderBallot, the new leader then initializes the Paxos state for all undecided transaction log entries using the first phase of Paxos consensus. In this phase, the leader sends a promise message to all replicas of the memnode asking them to reject any new proposals or promises with ballots lower than the new leaderBallot. This message ensures that the Paxos state on replicas is consistent with subsequent accept messages that the new leader will send.

In some embodiments, the method 200 may include a reaper procedure, which may be used to periodically check for stalled transactions and attempt to complete them using a "reaper." For each stalled transaction, the reaper may communicate with the replicas for each memnode that is specified by the particular transaction in order to determine the appropriate outcome of the transaction. If all of the replicas for a particular memnode are alive and agree to commit the transaction, the reaper may drive the transaction forward to completion without initiating the consensus procedure. On the other hand, if the replicas are out of sync, i.e., if some replicas do not agree to commit the transaction, the reaper may rely on the outcome of the consensus algorithm to determine whether to commit or abort the transaction. In this case, once the consensus algorithm has converged, the reaper may then abort or commit the transaction, depending on the outcome.

Figure 3:
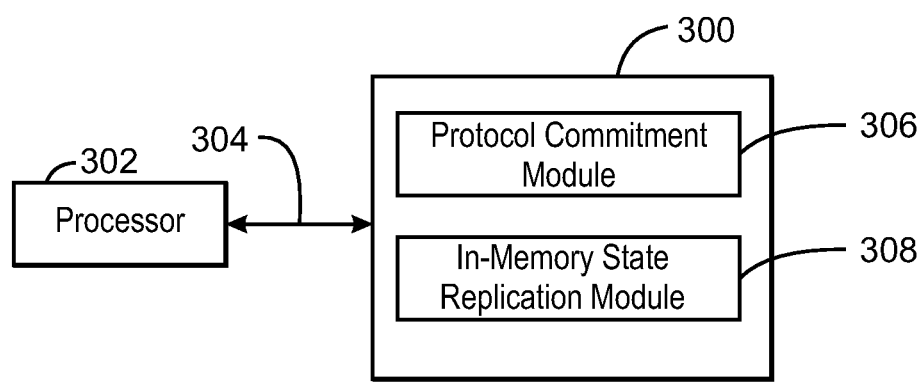
FIG. 3 is a block diagram showing a tangible, non-transitory computer-readable medium that stores a protocol adapted to direct a memnode to execute replication and transaction commitment, in accordance with embodiments.

FIG. 3 is a block diagram showing a tangible, non-transitory computer-readable medium 300 that stores a protocol adapted to direct a memnode to execute state-machine replication and transaction commitment, in accordance with embodiments. The protocol integrates state-machine replication with non-blocking transaction commit in a distributed transactional store. The computer-readable medium 300 may be accessed by a processor 302 over a computer bus 304. Furthermore, the computer-readable medium 300 may include code to direct the processor 302 to perform the steps of the current method.

The various software components discussed herein may be stored on the tangible, non-transitory computer-readable medium, as indicated in FIG. 3. For example, a protocol commitment module 306 may be adapted to direct the processor 302 to perform the steps of the transaction commitment protocol, as discussed with respect to FIG. 2. In addition, an in-memory state replication module 308 may be adapted to direct the processor 302 to perform the steps of the replication protocol, as also discussed with respect to FIG. 2.

While the present techniques may be susceptible to various modifications and alternative forms, the exemplary embodiments discussed above have been shown only by way of example. It is to be understood that the technique is not intended to be limited to the particular embodiments disclosed herein. Indeed, the present techniques include all alternatives, modifications, and equivalents falling within the true spirit and scope of the appended claims.

What is claimed is:

1. A method, comprising:
   receiving a minitransaction from a client node at one or more memory nodes, each memory node comprising a plurality of replicas;
   wherein the minitransaction comprises a type of transaction which atomically executes any combination of reading, comparing, and writing to any of a plurality of memory locations;
   determining, for a leader of the plurality of replicas within a memory node, whether the leader is able to commit the minitransaction;
   stabilizing state changes of the minitransaction within a transaction log using a consensus procedure to update the plurality of replicas;
   for each replica of the one more memory nodes, sending a vote to commit the mini transaction from the replica to the client if the replica is able to commit the minitransaction;
   determining, at the client, whether a quorum of the plurality of replicas at each memory node is able to commit the minitransaction;
   if, at each memory node, a quorum of the plurality of replicas is able to commit the minitransaction, sending a commit message from the client to each replica; and
   if a quorum of the plurality of replicas at each memory node is not able to commit the minitransaction, sending an abort message from the client to each replica.

2. The method of claim 1, wherein the leader of the plurality of replicas may change at any time, multiple leaders may exist at any one time, the client node may fail, and a minority of the plurality of replicas may fail.

3. The method of claim 1, wherein stabilizing the state changes of the minitransaction within the transaction log using the consensus procedure comprises applying a Paxos agreement protocol across the plurality of replicas.

4. The method of claim 1, wherein receiving the minitransaction from the client node at the one or more memory nodes comprises receiving a prepare message for the minitransaction at the one or more memory nodes.

5. The method of claim 1, wherein determining whether the leader is able to commit the minitransaction comprises the leader of the plurality of replicas locking the transaction log and comparison set matching values stored in the leader.

6. The method of claim 1, wherein determining whether the leader is able to commit the minitransaction comprises performing a stabilization procedure, wherein the stabilization procedure applies Paxos consensus on a transaction log entry within the memory node, and the client node learns the result of the stabilization procedure.

7. The method of claim 1, comprising updating a state of each of the plurality of replicas to a most recent state by processing and installing in order the state changes of all successfully committed minitransactions in the transaction log.

8. A system, comprising:
   a client node configured to generate a transaction and send the transaction to one or more memory nodes, wherein each memory node comprises an address space of shared memory and a plurality of replicas, and wherein the transaction is a minitransaction;
   each memory node configured to:
     receive the transaction from the client node, wherein a leader of the plurality of replicas is configured to stabilize the transaction if the leader is able to commit the transaction;
     stabilize state changes of the transaction in a transaction log using a consensus procedure to update the plurality of replicas;
     for each replica of the one more memory nodes, sending a vote to commit the transaction from the replica to the client if the replica is able to commit the transaction;
     determining, at the client, whether a quorum of the plurality of replicas at each memory node is able to commit the transaction;
     if, at each memory node, a quorum of the plurality of replicas is able to commit the transaction, sending a commit message from the client to each replica; and
     if, at each memory node, the quorum of the plurality of replicas is unable to commit the transaction, sending an abort message from the client to each replica.

9. The system of claim 8, wherein the leader of the plurality of replicas may change at any time, multiple leaders may exist at any one time, the client node may fail, and a minority of the plurality of replicas may fail.

10. The system of claim 8, wherein each memory node comprises a plurality of consensus-based replicas, and wherein the plurality of consensus-based replicas comprise a plurality of replicas that utilize a Paxos consensus algorithm to perform the consensus procedure.

11. The system of claim 10, comprising updating a state of each of the plurality of replicas to a most recent state by installing the state changes of successfully committed transactions in order of the transaction log until a most recent undecided transaction.

12. The system of claim 8, wherein the transaction comprises a transaction instruction set, comprising at least one of:
- a write subset having at least one write member, wherein the write member comprises a memory node identifier, a memory address, and write data;
- a compare subset having at least one compare member, wherein the compare member comprises a memory node identifier, a memory address range, and compare data;
- a read subset having at least one read member, comprising a memory node identifier and a memory address range; or
- any combination of the write subset, the compare subset, and the read subset.

13. The system of claim 8, wherein the transaction utilizes a replicated transaction log that is replicated to a separate degree from a replication degree of a memory node state.

14. The system of claim 13, wherein there is a separate transaction log per page or chunk of memory to allow concurrency among transactions.

15. The system of claim 8, comprising a reaper configured to check for stalled transactions and to attempt to complete the stalled transactions.

16. A tangible, non-transitory computer-readable medium that stores a protocol adapted to execute state-machine replication and transaction commitment within a memory node, wherein the memory node comprises a plurality of replicas, and wherein the protocol comprises instructions to direct a processor to:
- receive a transaction from a client node at the memory node, wherein the transaction is a minitransaction;
- determine, for a leader of the plurality of replicas, whether the leader is able to commit the transaction;
- stabilize an update set of the transaction in a transaction log using a Paxos consensus procedure across the replicas;
- send a vote to commit the transaction to the client node if a quorum of the plurality of replicas at all of the one or more memory nodes is able to commit the transaction and state changes of the transaction are stable in the transaction log; and
- commit the transaction if a commit message is received from the client node.

17. The tangible, non-transitory computer-readable medium of claim 16, wherein the transaction log comprises a plurality of transaction logs, and wherein each of the plurality of transaction logs corresponds to a memory region or page of a predetermined size within the memory node that is affected by the transaction.

18. The tangible, non-transitory computer-readable medium of claim 17, wherein the plurality of transaction logs may be executed in parallel as long as the plurality of transaction logs do not utilize a same memory region or a same page within the memory node.

* * * * *